United States Patent [19]
Ney et al.

[11] 3,879,518

[45] Apr. 22, 1975

[54] ELECTRIC CABLES

[75] Inventors: Robert Ney, Heistern Kreis Aachen; Hans-Christoph Rhiem, Eschweiler Kreis Aachen, both of Germany

[73] Assignee: Lynenwerk KG, Eschweiler Kreis Aachen, Germany

[22] Filed: Sept. 4, 1973

[21] Appl. No.: 393,753

[30] Foreign Application Priority Data
Sept. 5, 1972 United Kingdom............... 41209/72

[52] U.S. Cl............... 264/174; 174/113 R; 264/134
[51] Int. Cl................................................. B29f 3/10
[58] Field of Search............................ 264/174, 134

[56] References Cited
UNITED STATES PATENTS

| | | | |
|---|---|---|---|
| 3,068,532 | 12/1962 | Higgins | 264/174 |
| 3,533,870 | 10/1970 | Mackay et al. | 264/174 |
| 3,737,490 | 6/1973 | Nicholson | 264/174 |
| 3,789,099 | 1/1974 | Garrett et al. | 264/174 |

Primary Examiner—Melvyn I. Marquis
Attorney, Agent, or Firm—Walter Becker

[57] ABSTRACT

A method of producing an electric cable by means of cable sheathing head, according to which a cable core is fed into the cable sheathing head into which a polyolefin material is so extruded that it embraces the core to form a sheath therefor while bundles of glass fibers free from a bonding agent are fed into the cable sheathing head in such a way that the bundles are embedded in and bonded to the sheath material at angularly spaced locations about the axis of the cable core. The glass fibers are arranged to permit compacting thereof into a bundle of minimum cross section and the fibers in each of the bundles are preliminarily compacted within the head while the air entrained with the fibers is removed from each bundle. The fibers are additionally compacted and the compacting is maintained by a shrinkage exerted when the sheath material cools after leaving the head, while radially extending undulations are formed in each bundle to improve the mechanical bonding of a bundle within the polyolefin material.

11 Claims, 5 Drawing Figures

ELECTRIC CABLES

This invention relates to electric cables, especially for power or telecommunication. Self-supporting aerial cables for overhead transmission lines may be composed of at least one insulated conductor and a synthetic plastics sheath containing substantially continuous longitudinal elements for taking up the tensile load in the cable when the latter is suspended between the poles or pylons of the overhead system, thereby relieving the conductor of the load. Such self-supporting aerial cables are used to carry power or are used for telecommunication purposes, and they may serve for connecting remote users or telecommunication equipment. The self-supporting cables are held by means of suspension clamps, particularly linearly acting clamps, and the coupling between the load-bearing elements incorporated in the cable to take up the load and the clamping elements of the suspension clamps is of major importance in ensuring that the cables are in fact suspended in accordance with the rules that apply to overhead suspension from pole to pole or to some other point of support.

Electrical cables containing substantially continuous longitudinal elements concentrically disposed in the outer sheath of the cable about the insulated conductors are already known in the art; however, these elements are not load-bearing elements but metallic neutral or earth conductors. In another known electric cable the insulation which consists more particularly of polyvinyl chloride is provided inside and outside with a reinforcement of glass fibers which adhere preferentially to the insulation. For this purpose the synthetic plastics of the insulation is suitably prepared. The purpose of the reinforcement of glass fibers is to protect the cable from temperature effects that may damage other components of the cable.

It is, therefore, an object of this invention to provide an improved electric cable and method of making the same, which will overcome the above mentioned drawbacks.

These and other objects and advantages of the invention will appear more clearly from the following specification, in connection with the accompanying drawings, in which.

Figure 1:
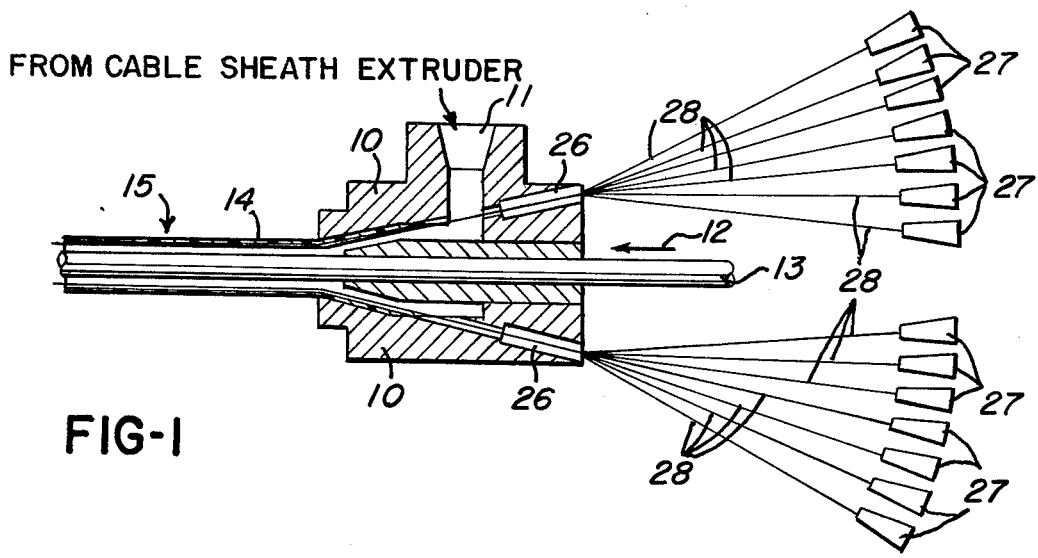
FIG. 1 is a schematic drawing of an extrusion head of a cable-extruding machine for practicing the method according to the invention.

The method according to the present invention of producing an electric cable primarily comprises the steps of feeding a cable core into a cablesheathing head, extruding a polyolefin material into the head so that the material embraces the core to form a sheath therefor, feeding bundles of glass fibers into the head so that the bundles are embedded in the sheath material at angularly spaced locations about the axis of the core, each bundle being formed of fibers which have not been impregnated with a bonding agent and which are arranged to allow for ease of compacting into a bundle of minimum cross section, effecting a preliminary compacting of the fibers in each bundle within the head, removing from each bundle air entrained with the fibers, arranging for the sheath material to be supplied in a manner which provides additional compacting of the fibers, the said compacting being maintained by a shrinkage pressure exerted when the sheath material cools after leaving the head, and forming radially extending undulations in each bundle, thereby improving the mechanical bonding of a bundle within the polyolefin.

A cable produced by a method according to the invention contains non-corroding means for taking up the tensile load and can be of low weight and possess better transmission properties than a conventional self-supporting aerial cable which contains means for taking up the tensile load in the form of a steel wire braiding. The cable may be suspended with the aid of the same kind of suspension clamps that have proven their usefulness in the course of many years service. Moreover, the cable can possess at least the same degree of flexibility as known cables and permit a more rapid, simpler and safer method of handling during assembly.

Self-supporting aerial cables when used in conventional overhead line systems are suspended in spans of 50 meters length between wedge-type suspension clamps which transmit the load linearly. The magnitude of the tensile load which the loadbearing elements are called upon to support, and for which they must be designed, is known from experience and calculation, and additional loads that must also be taken into consideration, such as frosting, icing, and wind pressure, can be calculated by using a general formula, the entire load being multiplied by a safety factor. For different cable types regulations prescribe minimum breaking loads. In order to provide these minimum breaking loads a relatively large number of glass fibers must be embedded in the sheath and preferably this is done by embedding bundles of single or doubled yarns. For instance, a cable containing two conductor pairs and having a diameter under the sheath of about 3.5 mm needs a total of 84 separate yarns of a filament fineness of 136 tex; a cable containing ten cores, each comprising a pair, and having a diameter under the sheath of 8.0 mm requires 168 individual yarns of the same filament fineness consisting of a suitable glass fiber for achieving the prescribed minimum breaking strengths.

According to the present invention it has been established that a material condition for achieving the best results from glass fibers embedded in a synthetic plastics sheath is to create as intimate and sound a bond between the glass fibers and the sheath material as possible. In the past such a bond could be achieved only by providing the glass fibers with an impregnation selected according to the nature of the plastics material, in the form of a bonding agent which at the same time also fulfilled the purpose of preventing frictional forces from arising between contacting glass fibers. In a method according to the present invention there are employed, as load-bearing elements, unimpregnated glass silk fibers, i.e. fibers that are free from adhesive bonding agents. Instead, the fibers are embedded in a synthetic plastics sheath, and a mechanical bond is created between the glass fibers and the material of the sheath to achieve optimal load-bearing capacity of the load-bearing elements in the suspended cable. At the same time it is desirable that all the individual elements should equally participate in taking up the load and that a destruction of the glass fibers by frictional contact should be prevented.

Suitably, expenditure on material is kept to a minimum and a cable is produced which is characterized by the lowest possible weight in conjunction with the least external diameter, and in which the strain on the supports and suspension means during the suspension of the cable is reduced to a minimum.

Referring now to the drawings in detail, FIG. 1 shows an extrusion head 10 which communicates via an opening 11 with a part (not shown) of a cable sheath extruder containing a screw. A prefabricated cable core 13 comprising insulated electrical conductors enters the extrusion head 10 in the direction indicated by an arrow 12 and is provided, in the extrusion head with an external sheath 14. The finished cable 15 leaves the nozzle at the outlet from the head and is cooled in conventional manner.

Figure 2:
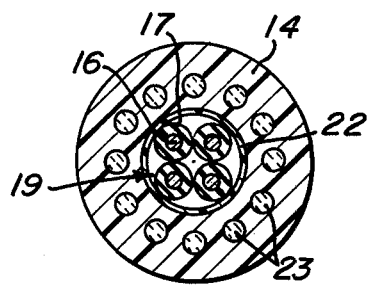
FIG. 2 is a section through a self-supporting aerial cable containing two pairs of conductors and twelve elements for taking up the tensile load in the form of bundles of glass fibers.
Figure 3:
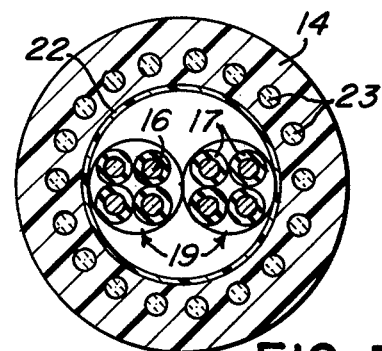
FIG. 3 is a section through a self-supporting aerial cable containing four pairs of conductors and eighteen glass fiber elements for taking up the tensile load.
Figure 4:
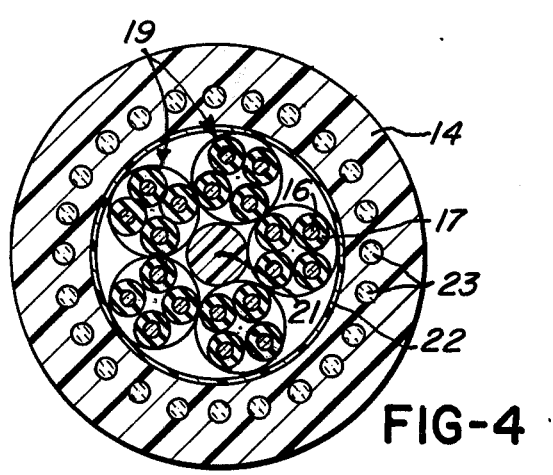
FIG. 4 is a section through a self-supporting aerial cable containing ten pairs of conductors and 24 glass silk fiber elements for taking up the tensile load.

FIGS. 2 to 4 respectively show cross sections of finished cables 15. These figures show cables having a core which comprises conductors 16 provided with insulation 17, viz. a spiral quad of two twisted conductor pairs 19 in FIG. 2 and several such cores in FIGS. 3 and 4 which, in conjunction with an axial strand 21 made of synthetic plastics material, constitute the cable proper. The individual twisted conductor pairs 19 are each covered overall with synthetic plastics tape 22.

In the extrusion head 10 a polyethylene sheath 14 is extruded to envelop the cable core and the insulation 22, which enters the nozzle together with the cable core 13. The sheath incorporates a varying number of bundles 23 of glass silk fiber for taking up the tensile load. The bundles may be composed of single or double yarns 24 (FIG. 5) of varying filament fineness and the number of bundles 23 and the number of glass silk yarns 24 in each bundle are determined by reference to the number of conductor pairs 19, the required minimum breaking strength of the cable and the thickness of the single or double yarns 24 according to the following table:

| Pairs | Bundles | Glass silk singles/doubles | Fineness of Filaments |
|---|---|---|---|
| 2 | 12 | 7 singles | 1 × 136 tex |
| 4 | 18 | 6 singles | 1 × 136 tex |
| 4 | 18 | 2 doubles | 3 × 136 tex |
| 6 | 18 | 6 singles | 1 × 136 tex |
| 10 | 24 | 6 singles | 1 × 136 tex |
| 10 | 24 | 14 singles | 1 × 68 tex |

The observance of these rules ensures that, in addition to economy in the employment of material for producing the elements that are to carry the tensile load and the consequent advantageous effects respecting weight, flexibility etc. a maximum tensile load can be transmitted from the suspension clamps to the load-bearing elements, the load-bearing elements, or their individual single or doubled yarns, participating evenly in taking up the load.

Figure 5:
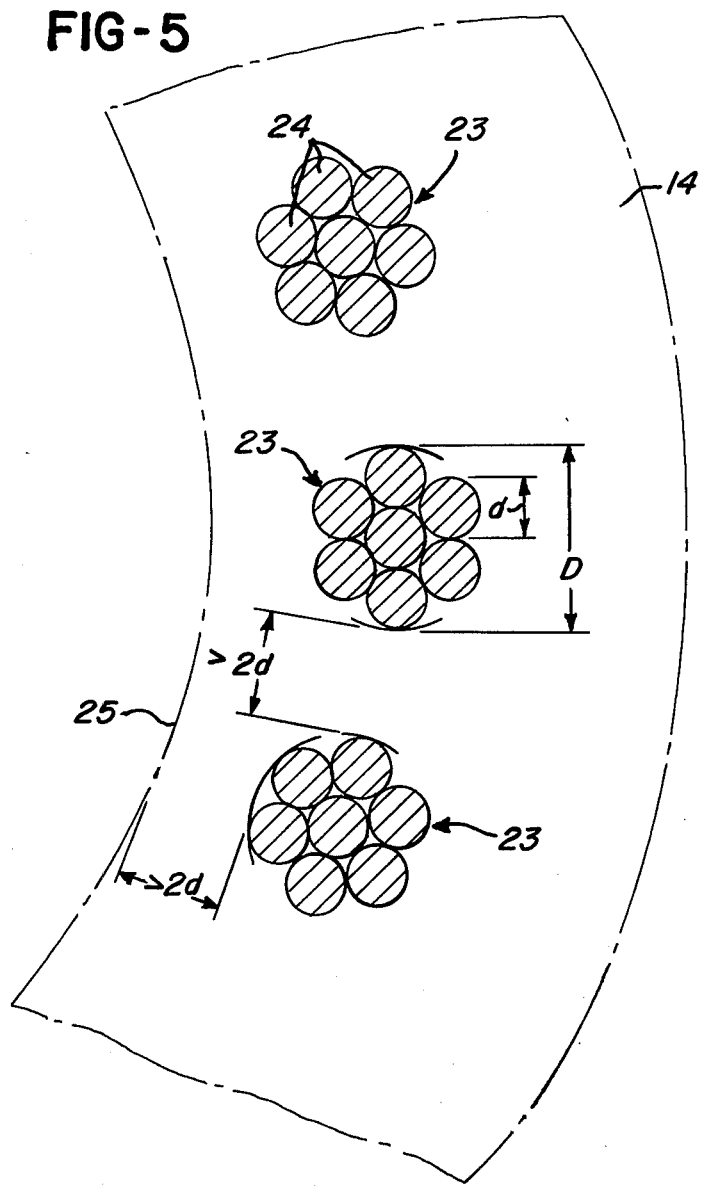
FIG. 5 is a section of part of the external sheath of a self-supporting overhead cable containing embedded bundles of glass silk fiber yarns, illustrating the minimum spacing between the bundles and of the bundles in relation to the internal circumference of the sheath.

The spacing of the bundles 23 between themselves and their distance from the inner circumference 25 of the sheath in FIG. 5 should be at least twice the diameter $d$ of one single or doubled yarn 24, as illustrated in FIG. 5, where D is the bundle diameter and $d$ the diameter of a single or doubled yarn.

If the prescribed minimum thickness of the polyethylene envelope which surrounds each individual load-bearing element and which forms part of the cable sheath is allowed, the load will be transferred in its entirety by the polyethylene sheath to the individual elements. The webs which in cross section intervene between the individual elements will be sufficient to allow the shrinkage stresses originating in the polyethylene and radially acting on the individual elements as compressing forces, to take effect in a manner that ensures the generation of an intimate mechanical bond between the non-adhesive, non-pre-impregnated glass fibers and the polyethylene. When the cable is suspended, these webs of material are capable, within the operative range of the suspension clamps, to transfer the load that each individual element should carry proportionately to the sector of the cross section of the single or doubled yarn that is close to the cable core. In this way an even load distribution between the individual single or doubled yarns in the cross section is obtained, which fact permits the load-bearing ability of the glass fiber to be economically utilized while preventing relative displacement between the individual glass fibers, thereby precluding premature failure of the tensile load-bearing elements.

The product, indicated by reference number 15 in FIG. 1 of the method of production according to the invention having been thus described, the method and its several steps will now be elucidated in detail, likewise with reference to FIG. 1.

As illustrated in FIG. 1 several ducts 26 which concentrically surround the feeding cable 13 are located on the entry side of the extrusion head 10, only two of these ducts being actually shown in the drawing. Preceding the entry end of each duct 26 at a given distance therefrom are storage and supply means for glass fibers, preferably in the form of a plurality of bobbins 27 wound with glass fiber yarns 28 and mounted in a creel, not shown in the drawing. The yarns 28 of glass fibers must first of all be appropriately selected with a view to achieving optimum results in regard to the load-bearing ability of the finished cable. Yarns consisting of 9 micron glass fiber monofils have been found to be best, since such yarns permit a more uniform bundle to be formed than thinner yarns, allow the occluded air to be more easily removed, admit of less effort being expended for condensing the bundles, besides enabling a better pressing of the bundle by the cooling material of the sheath to be achieved. In principle, thicker threads are quicker and easier to put in order than thinner threads if the aim is to achieve an ideally condensed bundle. It is also desirable that the threads should cross as little as possible in the bundle since this ensures the presence of the relatively largest number of filament lengths extending in the direction of tensile stress and thus capable of taking up the tensile load. As soon as a thread relinquishes a straight linear orientation and moves into an adjacent or neighboring zone before finally returning to its old position of alignment, such a thread ceases to be available in the direction of tensile stress and to participate in the transmission of the load in the transitional region.

If the correct glass fiber material has been chosen the bundle is first pre-condensed, for instance in the ducts 26 in FIG. 1, and for this purpose these ducts may be progressively narrowed in consecutive steps. The object is to force the individual threads of a bundle to assume positions approaching an ideally condensed bundle. The pre-condensed bundles are then guided into the cable sheath in the extrusion head, and as soon as this is the case, the extrusion pressure of the molten polyethylene material of the sheath acts on the bundle not only to maintain the existing tight condensation but to compact this to completion. In other words, the individual threads will be so tightly packed together side by side that it would be impossible to pack them any tighter. As a final step this densely packed arrangement is maintained after the sheathed cable has left the extrusion head by taking advantage of the three-dimensional contraction in volume of the sheath material when this cools, and the tendency of the bundle of glass fiber single or doubled yarns to resume its original arrangement is thus obviated.

The precondensation of the glass fiber bundles 28 as they travel from the supply means 27 outside the extrusion head 10 to their point of entry into the polyethylene mass includes the further step of removing the ballast air occluded in the bundles.

For the successful performance of the method, the following additional matters also require attention: The individual elements of the bundles must be kept apart to prevent the doubled or twisted individual elements from further intertwisting and to ensure that they will run into the polyethylene means parallel to the cable axis. By carefully braking the individual elements, care must be taken to see that braking force makes them travel with their individual filaments orientated substantially towards the convergent end of the ducts without kinking. Particularly important for bringing about a successful precondensation is the expulsion of air from the yarn-conducting ducts directly preceding the extrusion nozzle, by feeding the individual elements through a reduced pressure zone, causing the ballast air which is entrained by the individual elements and heated during their advance to the extrusion nozzle to be expelled from the individual elements. The final bores of the ducts 26 should have a minimum diameter sufficient to cause the individual elements and hence the bundles to be compressed before they are received into the polyethylene mass. This minimum diameter, and hence the smallest cross section of a final stage of precondensation, should not exceed about 110% of the cross section the bundles will occupy after thay have been embedded in the synthetic material, bearing in mind that the polyethylene mass shrinks about 10% when it cools. Finally, an additional degree of condensation is achieved by exposing the bundles leaving the ducts 26 and entering the polyethylene mass to the high extrusion pressure of 50 to 100 kp/sq.om until shrinkage of the polyethylene begins. A factor which is contributory to ensuring success is that the ballast air must be expelled inside the above described feed ducts 26 sufficiently for the residual air which is carried into the polyethylene mass and which occupies a maximum volume directly after entering the hot polyethylene mass not to stop the volume contraction of the polyethylene. All these steps assist in achieving a minimum possible bundle cross section. The closed minimum cross section of each bundle is also essential to ensure separation of neighbouring bundles, which are fairly closely disposed in the cable sheath, to permit webs of polyethylene to form between the neighbouring bundles.

After having left the extrusion head 10 the finished cable 15 is cooled.

The contraction in volume of the polyethylene during cooling is thus utilised for maintaining the completely tight packing of the bundled glass fibres embedded in the cable sheath and for the generation of a lasting pressure which ensures as uniform as possible a participation of all the threads in the bundle in bearing the tensile load. For transferring the load introduced into the cable by the suspension clamps through the sheath into the interior of the individual load-bearing elements, as uninterrupted as possible a chain of contacts between the monofils is needed to enable the innermost threads of the loadbearing element to participate fully in taking up the load.

The shrinkage component which, according to the invention, is also effectively utilised in the longitudinal axis of the cable of bundles results in the bundles being axially compressed so that they cease to be exactly parallel to the cable axis and assume undulations, although in the radial direction parallelism is retained, giving rise to a configuration resembling that of wavy hair. According to the applied braking force which brakes the individual elements during their withdrawal from the supply bobbins the waviness is controllable within limits in as much as increased braking causes the individual elements to be embedded in the polyethylene mass with greater tensile strain so that there is less subsequent latitude for the development of a compressive force.

On the other hand, the undulations of the bundles achieve two results, namely on the one hand they lead to an intensification of the mechanical anchorage between the bundles and the polyethylene which is otherwise incapable of bonding to glass fiber in the absence of an adhesive. On the other hand the flexibility of the cable is improved and a particularly useful result is that the distribution of the bundles in the sheath, mutual support of the bundles, and the stress distribution in the sheath during shrinkage cause the undulations to be substantially radial so that the annulus of bundles adapts itself to the compressive and tensile strains during flexure like a bellows.

The amplitude of the undulation determines the maximum permissible diameter of the bundles in the cable. The diameter of the bundles may be the greater, the greater the amplitude of the undulation. If the maximum permissible limit for the diameter of the bundles is exceeded the tensile forces cannot be fully distributed over the bundle cross section so that the individual elements in the interior of the bundle cease to take part in carrying the loads.

The webs of polyethylene which separate the several radially distributed bundles provide mutual support between the bundles and constitute bridges of material which between the ring of sheathing material nearest the cable core and the ring enveloping the outside of the bundled glass yarn are necessary for achieving the utmost condensation during shrinkage. The minimum quantity of sheathing material that should be associated with one bundle must be so chosen that the longitudinal compressive force which decides the degree of radial shrinkage is sufficient to bond the bundles and by producing radial undulations causing them to contract in relation to their length prior to undulation.

In the proposed method undulation is not a spontaneous process since, contrary to glass-fiber-reinforced synthetic plastics materials, the inert substances polyethylene and glass fibers will not adhere by virtue of interface reactions in the absence of an adhesive. It is therefore an important advantage of the present method that the above mentioned mutually completely inert and unreactive substances can be combined by the proposed steps to form a mechanically interconnected unitary structural system which is equivalent in its properties to those of a glass-fiber reinforced plastics material. The present method achieves such a mechanical connection between a pure thermoplastic and an endless glass fiber devoid of adhesive. The result is a system consisting of a thermoplastics material and an unimpregnated glass fiber system, which has features that were hitherto known only in the case of glass-fiber-reinforced duroplastic materials, namely endless glass fibers, controlled directional orientation, monoaxial reinforcement and the possibility of using glass fibers in diverse forms, i.e. as single or doubled yarns, and spun threads of different fineness together in the same bundle. On the other hand, the conventional glass-fiber-reinforced thermoplastics materials require the employment of a bonding agent which creates a chemical bond at the interfaces. Incidentally, the thermoplastics material is molded from a glass-fiber-containing granular material, whereas in the present invention the glass fibers and the thermoplastics material are fed to the molding machine in their original virgin condition.

An important aspect of the proposed production of the cable sheath 14 in which the bundles 28 are incorporated, is the production of the sheath from a polyolefin, such as polyethylene. In the term "polyolefin" are included copolymers of olefins such as ethylene and propylene. This plastics material provides a relatively significant amount of volumetric shrinkage when it cools because it forms crystalline aggregations within a very narrow temperature range corresponding to the melting range. By contrast, for instance a soft polyvinyl chloride is a gel and has no crystal zones. Accordingly the latter material has no narrowly defined melting range, but a softening range extending over several tens of degrees, and the shrinkage of such a system when it cools is very slight. This comparison primarily demonstrates that polyvinyl chloride cooling under extrusion conditions remains for some time, i.e. within a wide temperature range, in a plastic and soft yielding condition and is not therefore capable of containing the bursting force of the bundles that have been compacted in the extrusion head. The maintenance of a mechanical bond within the meaning of the invention therefore requires the use of a synthetic plastics material which has the properties of polyethylene, or which behaves in a similar manner.

It is, of course, to be understood that the present invention is, by no means, limited to the specific showing in the drawings, but also comprises any modifications within the scope of the appended claims.

What we claim is:

1. A method of producing an electric cable by means of a cable-sheathing head, which includes the steps of: feeding a cable core into a cable-sheathing head, extruding a polyolefin material into the said head so that said polyolefin material embraces said core to form a tubular-formed sheath therefor, feeding bundles of unimpregnated glass fibers free from any adherence means into said head so that the bundles are embedded in and mechanically connected to the tubular-formed sheath material at angularly spaced locations circularly distributed about the axis of the core, said glass fibers being arranged to permit ducted gathering thereof into a pre-compressed bundle of minimum cross section prior to introduction in said head, effecting a preliminary compacting of the fibers in each of said bundles within said head, subjecting each bundle to underpressure for removing the air entrained with the fibers in the respective bundle, supplying the sheath material so as to provide additional compacting of the fibers, maintaining said compacting by a shrinkage exerted during contraction when the sheath material quickly cools to harden at atmospheric pressure after leaving said head, and forming radially extending undulations in each bundle to thereby improve the mechanical connection of a bundle within the polyolefin.

2. A method of producing electrical cables for power transmissions and telecommunications, which includes the steps of: providing a cable containing at least one insulated electric conductor, extruding around said cable a polyethylene cable sheath, so embedding in said polyethylene cable sheath bundles of unimpregnated glass fibers free from any adherence means but capable of being associated in the form of single and double yarns in the respective bundle and so relatively spacing said bundles concentrically about said cable that each bundle is enveloped by the minimum quantity of sheath material needed to generate compressive stress by shrinking sufficiently to cause a mechanical connection between the enveloping polyethylene sheath and the bundles of glass fibers to form, precondensing the bundles in preliminary narrowing means while they are being formed, removing ballast air contained in said bundles by subjecting thereof to underpressure and producing a packed and condensed association of glass fibers in each bundle while maintaining said compaction by the shrinkage pressure when the polyethylene sheath quickly cools after having been extruded, and forming undulations of the bundles in a direction longitudinally of said cable to improve anchorage in said polyethylene sheath of the element of the glass fibers which are to take up the tensile load.

3. A method according to claim 2, in which the amplitude of the undulations formed during volume contraction by way of cooling off of the polyethylene sheath whereby bundles become axially compressed is predetermined in conformity with the bundle diameter by increasing the amplitude with rising bundle diameter.

4. A method according to claim 3, in which the amplitude is increased with rising bundle diameter by controlling the braking force applied to elements feeding in the bundles.

5. A method according to claim 1, in which the width of each web of sheath material between two neighboring bundles is so selected as to be twice the diameter of a single yarn.

6. A method according to claim 1, in which the width of each web of sheath material between two neighboring bundles is so selected as to be twice the diameter of doubled yarn.

7. A method according to claim 1, wherein the distance of the bundles from the radially inner surface of the sheath is selected so as to equal twice the diameter of a single yarn.

8. A method according to claim 1, wherein the distance of the bundles from the radially inner surface of the sheath is selected so as to equal twice the diameter of doubled yarn.

9. A method according to claim 1, which includes the step of selecting the number of bundles and the number of glass fiber yarns in conformity with the number of conductor pairs in the cable core, the required minimum braking strength of the cable and fineness of the single and double yarns being determined according to the following table:

| Conductor pairs | Bundles | Glass fiber yarns singles/doubles | Yarn Fineness |
|---|---|---|---|
| 2 | 12 | 7 singles | 1 × 136 tex |
| 4 | 18 | 6 singles | 1 × 136 tex |
| 4 | 18 | 2 doubles | 3 × 136 tex |
| 6 | 18 | 7 singles | 1 × 136 tex |
| 10 | 24 | 7 singles | 1 × 136 tex |
| 10 | 24 | 14 singles | 1 × 68 tex. |

10. A method according to claim 1, in which glass fibers of different kinds are jointly incorporated in a bundle.

11. A method according to claim 10, in which said glass fibers of different kinds are selected from single and double yarns and spun filaments of different thicknesses.

* * * * *